US012222733B2

(12) United States Patent
Hong (10) Patent No.: US 12,222,733 B2
(45) Date of Patent: Feb. 11, 2025

(54) UNMANNED AERIAL VEHICLE CONTROL METHOD AND APPARATUS, BASE STATION AND UNMANNED AERIAL VEHICLE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 626 days.

(21) Appl. No.: 17/054,362

(22) PCT Filed: May 22, 2018

(86) PCT No.: PCT/CN2018/087914
§ 371 (c)(1),
(2) Date: Nov. 10, 2020

(87) PCT Pub. No.: WO2019/222926
PCT Pub. Date: Nov. 28, 2019

(65) Prior Publication Data
US 2021/0191428 A1    Jun. 24, 2021

(51) Int. Cl.
G05D 1/00 (2024.01)
G08G 5/00 (2006.01)
B64U 10/13 (2023.01)

(52) U.S. Cl.
CPC ........... *G05D 1/101* (2013.01); *G05D 1/0022* (2013.01); *G05D 1/0088* (2013.01);
(Continued)

(58) Field of Classification Search
CPC .... G05D 1/101; G05D 1/0022; G05D 1/0088; B64C 39/024; G08G 5/0013;
(Continued)

(56) References Cited

U.S. PATENT DOCUMENTS 8,983,682 B1 * 3/2015 Peeters .................. G16H 40/20
701/2
9,051,043 B1 * 6/2015 Peeters ................ G06Q 10/083
(Continued)

FOREIGN PATENT DOCUMENTS

CN            105005316 A      10/2015
CN            105739520 A       7/2016
(Continued)

OTHER PUBLICATIONS

International Search Report issued Feb. 28, 2019 in PCT/CN2018/087914 (submitting English translation only), 2 pages.
(Continued)

*Primary Examiner* — Tuan C To
*Assistant Examiner* — Dominick Mulder
(74) *Attorney, Agent, or Firm* — Oblon, McClelland, Maier & Neustadt, L.L.P.

(57) ABSTRACT

An Unmanned Aerial Vehicle (UAV) control method and apparatus, a base station and a UAV relate to the technical field of wireless communication. The method can include receiving an access message from a UAV, the access message carrying a type identifier of the UAV, acquiring target supervision strategy information based on the access message, the target supervision strategy information indicating a flight criterion of the UAV, and sending a control instruction to the UAV based on the target supervision strategy information, the UAV being configured to control flight based on the control instruction. A base station, when receiving the access message of the UAV, acquires the target supervision strategy information of the UAV based on the access message and controls flight of the UAV based on the target supervision strategy information, so that it is ensured that flight of the UAV meets a supervision requirement.

13 Claims, 7 Drawing Sheets

(52) U.S. Cl.
CPC ......... *G08G 5/0013* (2013.01); *G08G 5/0069* (2013.01); *B64U 10/13* (2023.01); *B64U 2201/20* (2023.01)

(58) Field of Classification Search
CPC .. G08G 5/0069; G08G 5/0026; G08G 5/0052; B64U 2201/20
USPC ............................................................ 701/2
See application file for complete search history.

(56) References Cited

U.S. PATENT DOCUMENTS

| | | | |
|---|---|---|---|
| 9,087,451 B1* | 7/2015 | Jarrell | G08G 5/0043 |
| 9,601,022 B2 | 3/2017 | Taveira | |
| 9,646,502 B1* | 5/2017 | Gentry | G08G 5/0013 |
| 9,821,910 B1 | 11/2017 | Suiter | |
| 2003/0058135 A1* | 3/2003 | Kimmet | B64D 45/0034 |
| | | | 340/945 |
| 2009/0315704 A1* | 12/2009 | Rosing | G06Q 10/08 |
| | | | 340/539.13 |
| 2010/0171647 A1* | 7/2010 | Naravanamurthy | G01S 13/767 |
| | | | 342/37 |
| 2014/0315166 A1* | 10/2014 | Williams | G09B 9/006 |
| | | | 434/220 |
| 2016/0253907 A1 | 9/2016 | Taveira | |
| 2016/0300496 A1* | 10/2016 | Cheatham, III | G08G 5/0078 |
| 2016/0371987 A1* | 12/2016 | Kotecha | G05D 1/0022 |
| 2017/0102699 A1* | 4/2017 | Anderson | G06V 20/17 |
| 2017/0142730 A1* | 5/2017 | Han | H04W 76/14 |
| 2017/0243494 A1 | 8/2017 | Taveira | |
| 2017/0253330 A1* | 9/2017 | Saigh | G08G 5/0069 |
| 2017/0364065 A1* | 12/2017 | Petruzzelli | G08G 5/0069 |
| 2018/0004201 A1* | 1/2018 | Zach | G08G 5/006 |
| 2018/0025650 A1 | 1/2018 | Taveira | |
| 2018/0061251 A1 | 3/2018 | Venkatraman et al. | |
| 2018/0276998 A1* | 9/2018 | Yu | G08G 5/0026 |
| 2018/0281946 A1* | 10/2018 | Obaidi | G08G 5/0034 |
| 2018/0322443 A1* | 11/2018 | Barrington | G06Q 10/08 |
| 2019/0114925 A1* | 4/2019 | Schulman | G08G 5/0082 |
| 2019/0155312 A1* | 5/2019 | Tam | G08G 5/0069 |
| 2019/0251850 A1* | 8/2019 | Stewart | G08G 5/0069 |
| 2020/0077321 A1* | 3/2020 | Shi | H04W 48/02 |
| 2020/0162149 A1* | 5/2020 | Poscher | H04L 61/4511 |

FOREIGN PATENT DOCUMENTS

| | | |
|---|---|---|
| CN | 105892473 A | 8/2016 |
| CN | 106249753 A | 12/2016 |
| JP | 2017-117017 A | 6/2017 |
| WO | WO 2018/040566 A1 | 3/2018 |

OTHER PUBLICATIONS

Written Opinion issued Feb. 28, 2019 in PCT/CN2018/087914 (submitting English translation only), 4 pages.
Combined Chinese Office Action and Search Report issued Mar. 26, 2019 in Chinese Patent Application No. 201880000439.0 (with English translation), 20 pages.
Combined Chinese Office Action and Search Report issued Dec. 16, 2019 in Chinese Patent Application No. 201880000439.0 (with English translation), 26 pages.
Extended European Search Report issued Dec. 10, 2021 in European Patent Application No. 18919844.3, 10 pages.
Indian Office Action issued Jan. 12, 2022 in Indian Patent Application No. 202047055028, 7 pages.

* cited by examiner

UNMANNED AERIAL VEHICLE CONTROL METHOD AND APPARATUS, BASE STATION AND UNMANNED AERIAL VEHICLE

RELATED APPLICATION

This application is a continuation of International Patent Application No. PCT/CN2018/087914 filed on May 22, 2018, the contents of which are incorporated herein by reference in its entirety.

TECHNICAL FIELD

The present disclosure relates to the technical field of wireless communication, including to a method and apparatus for controlling an Unmanned Aerial Vehicle (UAV), a base station and a UAV.

BACKGROUND

An unmanned aerial vehicle is called UAV for short, which is a non-manned aerial vehicle operated by a radio remote control device and its own programmed control device. Along with the rapid development, cost reduction and function improvement of UAV technologies, UAVs have been applied to more and more fields, for example, aerial photography, agriculture, express transportation, disaster relief, surveying and mapping, news reporting, and film shooting.

For standardizing the use of UAVs, UAVs are divided into different types such as micro, light, small, medium-sized, and large UAVs, and different supervision requirements are made on different types of UAVs in Interim Regulations on Flight Management of UAVs (Exposure Draft). UAVs are under chaotic supervision. A UAV communicates based on an unlicensed frequency band, for example, a 2.4 GHz frequency band. In such a communication manner, it is very likely that the UAV may not communicate normally under interference of another wireless network, and consequently the UAV may not be accurately controlled to fly and it may be difficult to effectively supervise the UAV.

SUMMARY

A first aspect provides a method for controlling a UAV, which may be applied to a base station. The method can include receiving an access message from a UAV, where the access message carrying a type identifier of the UAV. The method can further include acquiring target supervision strategy information based on the access message, the target supervision strategy information indicating a flight criterion of the UAV, and sending a control instruction to the UAV based on the target supervision strategy information, the UAV being configured to control flight based on the control instruction.

A second aspect provides a method for controlling a UAV, which may be applied to a UAV. The method can include sending an access message to a base station in a process of accessing the base station, wherein the access message carries a type identifier of the UAV and is used to acquire target supervision strategy information based on which a control instruction is sent to the UAV, and the target supervision strategy information indicates a flight criterion of the UAV. The method can further include receiving the control instruction from the base station, and controlling flight based on the control instruction.

A third aspect provides an apparatus for controlling a UAV, which may be applied to a base station. The apparatus can include a receiving module that is configured to receive an access message from a UAV, the access message carrying a type identifier of the UAV, an acquisition module that is configured to acquire target supervision strategy information based on the access message, the target supervision strategy information indicating a flight criterion of the UAV, and a sending module that is configured to send a control instruction to the UAV based on the target supervision strategy information, the UAV being configured to control flight based on the control instruction.

A fourth aspect provides an apparatus for controlling a UAV which may be applied to a UAV. The apparatus can include a sending module that is configured to send an access message to a base station in a process of accessing the base station, the access message carrying a type identifier of the UAV, the access message being used to acquire target supervision strategy information based on which a control instruction is sent to the UAV, and the target supervision strategy information indicating a flight criterion of the UAV. The apparatus can further include a receiving module that is configured to receive the control instruction from the base station, and a control module that is configured to control flight based on the control instruction.

A fifth aspect provides a base station, which may include a receiver, a transmitter, a memory and a processor. The receiver, the transmitter and the memory may be connected with the processor respectively. The memory may be configured to store instructions executable by the processor. The processor may be configured to receive an access message from a UAV, the access message carrying a type identifier of the UAV, acquire target supervision strategy information based on the access message, the target supervision strategy information indicating a flight criterion of the UAV, and send a control instruction to the UAV based on the target supervision strategy information, the UAV being configured to control flight based on the control instruction.

A sixth aspect provides a UAV, carrying a processor and a memory configured to store instructions executable by the processor. The processor may be configured to send an access message to a base station in a process of accessing the base station, the access message carrying a type identifier of the UAV, the access message being used to acquire target supervision strategy information based on which a control instruction is sent to the UAV, and the target supervision strategy information indicating a flight criterion of the UAV. The processor can be further configured to receive the control instruction from the base station, and control flight based on the control instruction.

A seventh aspect provides a non-transitory computer-readable storage medium, in which instructions may be stored. The instructions can be executed by a processor to implement the method for controlling a UAV provided in the first aspect and any possible implementation mode in the first aspect.

An eighth aspect provides a non-transitory computer-readable storage medium, in which instructions may be stored. The instructions can be executed by a processor to implement the method for controlling a UAV provided in the second aspect and any possible implementation mode in the second aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodi

DETAILED DESCRIPTION

For making the purposes, technical solutions and advantages of the present disclosure clearer, implementation modes of the present disclosure will further be described below in combination with the accompanying drawings in detail.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
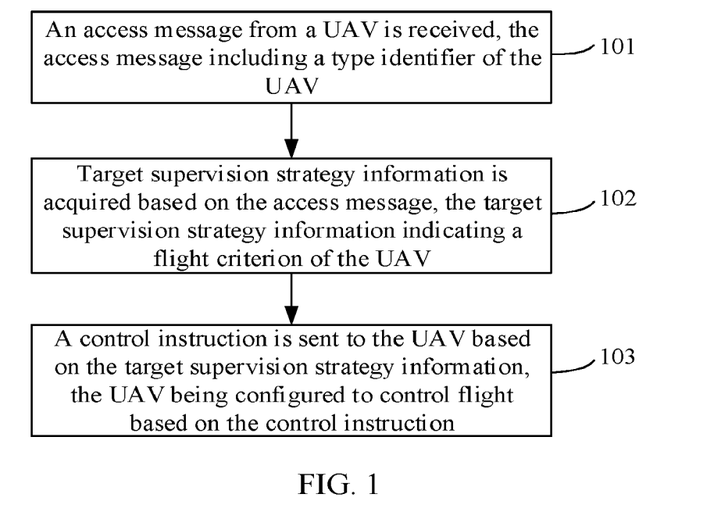
- FIG. 1 is a flowchart showing a method for controlling a UAV according to an exemplary embodiment.

FIG. 1 is a flowchart showing a method for controlling a UAV according to an exemplary embodiment. The method may be applied to a base station. As shown in FIG. 1, the method can include the following operations.

In Operation 101, an access message from a UAV is received, the access message carrying a type identifier of the UAV.

In Operation 102, target supervision strategy information is acquired based on the access message, the target supervision strategy information indicating a flight criterion of the UAV.

In Operation 103, a control instruction is sent to the UAV based on the target supervision strategy information, the UAV being configured to control flight based on the control instruction.

According to the method provided in the embodiment of the present disclosure, the base station, when receiving the access message of the UAV, may acquire the target supervision strategy information of the UAV based on the access message and control flight of the UAV based on the target supervision strategy information, so that it is ensured that flight of the UAV meets a supervision requirement. Since wireless communication with the UAV is performed based on a cellular network, the process of the communication is less susceptible to interference, the quality of the communication is reliable, the accuracy of controlling the UAV is improved, and effective supervision of the UAV may be implemented based on the method provided in the present disclosure.

In a possible implementation mode, the access message may be attach request signaling.

In a further implementation mode, the operation that the target supervision strategy information is acquired based on the access message may include that initial UE message signaling is sent to a core network, the initial UE message signaling carrying the attach request signaling, and the core network being configured to acquire the type identifier of the UAV from the initial UE message signaling, determine the target supervision strategy information based on the type identifier and send the target supervision strategy information to the base station, and the target supervision strategy information is received from the core network.

In a possible implementation mode, the access message may be a random access message.

In a another implementation mode, the operation that the target supervision strategy information is acquired based on the access message may include that a preset strategy table is read, the preset strategy table being configured to store supervision strategy information corresponding to different types of UAVs; and the supervision strategy information corresponding to the type identifier in the preset strategy table is determined as the target supervision strategy information, or, a first strategy request is sent to the core network, the first strategy request carrying the type identifier and the core network being configured to determine the target supervision strategy information based on the type identifier; and the target supervision strategy information is acquired from the core network; or, a second strategy request is sent to a UAV supervision platform, the second strategy request carrying the type identifier and the UAV supervision platform being configured to determine the target supervision strategy information based on the type identifier; and the target supervision strategy information is acquired from the UAV supervision platform.

In a possible implementation mode, the random access message may be an Msg3 in a random access process, or, the random access message may be an Msg5 in a random access process.

In a another implementation mode, the target supervision strategy information may include reporting requirement information of the UAV and one or more of a maximum flight speed, a flight range and a service expiration of the UAV.

The reporting requirement information may indicate whether information reporting is required before the UAV is used.

In a possible implementation mode, the operation that the control instruction is sent to the UAV based on the target supervision strategy information may include that, when the reporting requirement information in the target supervision strategy information indicates that information reporting is required before the UAV is used, whether the UAV has reported to the UAV supervision platform or not is determined based on a unique identifier of the UAV, and, in response to the UAV not reporting to the UAV supervision platform, a flight ban instruction is sent to the UAV.

All of the optional technical solutions may be freely combined into optional embodiments of the present disclosure, which will not be elaborated herein one by one.

Figure 2:
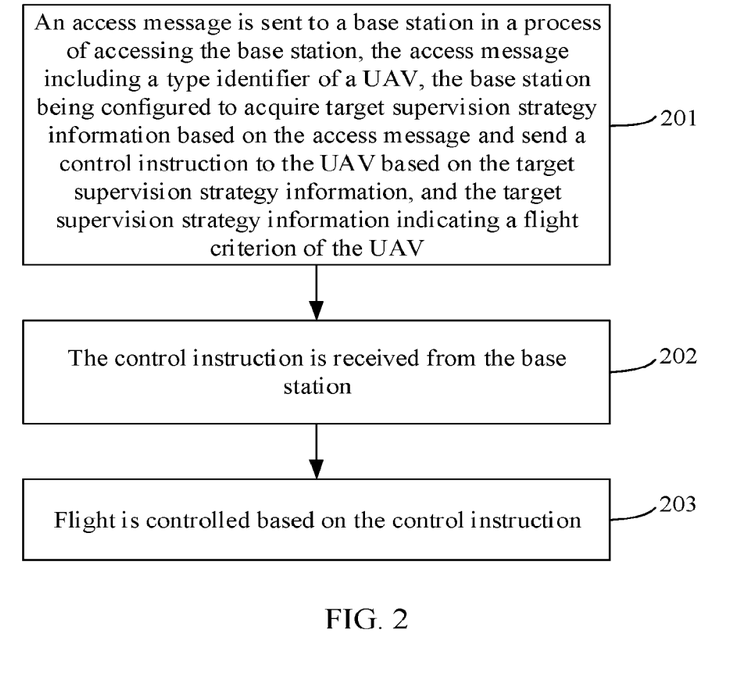
FIG. 2 is a flowchart showing a method for controlling a UAV according to an exemplary embodiment.

FIG. 2 is a flowchart showing a method for controlling a UAV according to an exemplary embodiment. The method may be applied to a UAV. As shown in FIG. 2, the method includes the following operations.

In Operation 201, an access message is sent to a base station in a process of accessing the base station. The access message carries a type identifier of the UAV; the base station is configured to acquire target supervision strategy information based on the access message and send a control instruction to the UAV based on the target supervision strategy information; and the target supervision strategy information indicates a flight criterion of the UAV.

In Operation 202, the control instruction is received from the base station.

In Operation 203, flight is controlled based on the control instruction.

According to the method provided in the embodiment of the present disclosure, the UAV may send the access message carrying the type identifier of the UAV to the base station in the process of accessing the base station, and then the base station may acquire the target supervision strategy information based on the access message and control flight of the UAV based on the target supervision strategy information, so that it is ensured that flight of the UAV meets a supervision requirement. Since wireless communication with the base station is performed based on a cellular network, the process of the communication is less susceptible to interference, the quality of the communication is reliable, the accuracy of controlling the UAV is improved, and effective supervision of the UAV may be implemented based on the method provided in the present disclosure.

In a possible implementation mode, the access message may be attach request signaling or a random access message. In another implementation mode, the access message may be a random access message.

The random access message may be an Msg3 in a random access process or an Msg5 in the random access process.

In a possible implementation mode, the target supervision strategy information may include reporting requirement information of the UAV and one or more of: a maximum flight speed, a flight range and a service expiration of the UAV. The reporting requirement information may indicate whether information reporting is required before the UAV is used.

In a possible implementation mode, the operation that flight is controlled based on the control instruction may include that, in response to receiving a flight ban instruction from the base station, a turning-off operation is executed.

All of the optional technical solutions may be freely combined into optional embodiments of the present disclosure, which will not be elaborated herein one by one.

Figure 3:
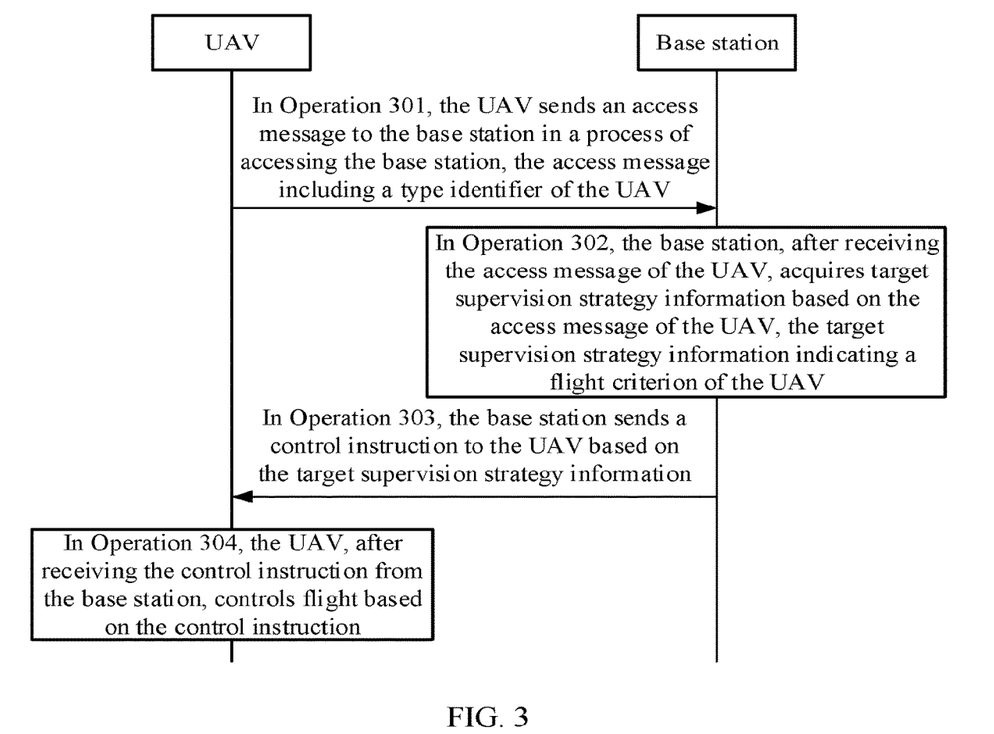
FIG. 3 is a flowchart showing a method for controlling a UAV according to an exemplary embodiment.

FIG. 3 is a flowchart showing a method for controlling a UAV according to an exemplary embodiment. As shown in FIG. 3, the following operations are included.

In Operation 301, a UAV sends an access message to a base station in a process of accessing the base station, the access message carrying a type identifier of the UAV.I In the embodiment of the present disclosure, the UAV, as UAV UE, may perform wireless communication through a cellular network. Based on this, the UAV may be accurately controlled based on a supervision requirement of the UAV, thereby implementing effective supervision on the UAV.

The UAV, after being turned on, may execute a flow of accessing the base station and send the access message to the base station. In the embodiment, the access message may include the following two forms.

A first form is the access message is attach request signaling, the attach request signaling carrying the type identifier of the UAV.

A second form is the access message is a random access message. In such case, the random access message is an Msg3 in a random access process, and the type identifier of the UAV is included in the Msg3, or, the random access message is an Msg5 in the random access process, and the type identifier of the UAV is included in the Msg5. No limits are made thereto in the embodiment.

The type identifier of the UAV in the access message may be represented in a Tag-Length-Value (TLV) format or may also be represented in another format. No limits are made thereto in the embodiment. The number of bits representing the type identifier may be determined according to the number of UAV types. For example, when there are five UAV types, the type identifier may be represented by 3 bits.

In the embodiment of the present disclosure, UAVs may be divided into micro, light, small, medium-sized and large UAVs, and of course, may also be classified according to another manner. For example, the UAV may be technically defined as any unmanned fixed-wing aircraft, an unmanned vertical take-off and landing aircraft, an unmanned airship, an unmanned helicopter, an unmanned multi-rotor aircraft and an unmanned parawing aircraft, and the like. No limits on the type of UAV are made thereto in the embodiment.

In Operation 302, the base station, after receiving the access message from the UAV, acquires target supervision strategy information based on the access message of the UAV, the target supervision strategy information indicating a flight criterion of the UAV. According to the embodiment of the present disclosure, the supervision strategy information matched with a type of the UAV may be determined directly according to the type, thereby implementing effective and accurate control and supervision on the UAV.

In the embodiment of the present disclosure, with regard to different access messages, the process that the base station acquires the target supervision strategy information based on the access message of the UAV may include the following implementation modes.

In a first implementation mode, the access message is the attach request signaling. The process that the base station acquires the target supervision strategy information based on the access message of the UAV may include the following Operations 302a1 to 302a4.

In Operation 302a1, the base station sends initial UE message signaling to a core network, the initial UE message signaling carrying the attach request signaling. The initial UE message signaling may be initial UE message signaling, and the base station may encapsulate the whole attach request signaling in the initial UE message signaling for transparent transmission to the core network. The initial UE message signaling may be sent to a Mobility Management Entity (MME) of the core network by the base station through an Si air interface.

In Operation 302a2, the core network acquires the type identifier of the UAV from the initial UE message signaling and determines the target supervision strategy information based on the type identifier.

The core network, after receiving the initial UE message signaling, may parse the initial UE message signaling to extract the attach request signaling therefrom and parse the attach request signaling to obtain the type identifier of the UAV. The process that the core network determines the target supervision strategy information based on the type identifier may include the following two implementation manners.

In a first implementation manner, the core network may locally acquire the target supervision strategy information. In this manner, the process that the target supervision strategy information is determined based on the type identifier may be as follows: the core network queries a strategy configuration table based on the type identifier of the UAV and determines supervision strategy information corresponding to the type identifier of the UAV in the strategy configuration table as the target supervision strategy information.

It is to be noted that the core network may pre-store the strategy configuration table for UAVs, the strategy configuration table indicating different types of UAVs and supervision strategy information corresponding to each UAV type. For example, the strategy configuration table records a corresponding relationship between a type identifier of a UAV and supervision strategy information.

In a second implementation manner, the core network may acquire the target supervision strategy information in real time from a UAV supervision platform based on the type identifier. In this manner, the process that the core network determines the target supervision strategy information based on the type identifier may be as follows: the core network sends a supervision strategy request to the UAV supervision platform, the supervision strategy request carrying the type identifier; the UAV supervision platform queries a strategy information base based on the type identifier; supervision strategy information matched with the type identifier in the strategy information base is determined as the target supervision strategy information, and the target supervision strategy information is returned to the core network.

The strategy information base at least stores multiple UAV type identifiers and supervision strategy information corresponding to each type identifier. It is to be noted that, in the embodiment, the core network is connected with the UAV supervision platform and the core network may acquire latest supervision strategy information in real time from the UAV supervision platform, so that the UAV supervision timeliness can be ensured. The UAV supervision platform may be built in a supervision server, and the supervision server may be a server cluster and may provide UAV supervision cloud service. The UAV supervision platform is configured to record reported information of UAVs, unique identifiers of the UAVs, position information of the UAVs and supervision strategy information of the UAVs.

For the supervision strategy information of the UAVs, UAV supervision strategies may be specified in advance according to supervision policies for different types of UAVs. The supervision policies for each type of UAVs are digitalized to obtain the supervision strategy information of each type of UAVs. The UAV supervision platform stores the supervision strategies for each type of UAVs. During specific implementation, a unified UAV type identifier may be adopted for the UAV supervision platform, the core network, the base station and the UAV. For example, it is unified that 1 represents a micro UAV, 2 represents a light UAV, 3 represents a small UAV, 4 represents a medium-sized UAV and 5 represents a large UAV. Of course, the unified type identifier may also not be adopted, but a type identifier comparison table for UAVs may be set and the type of the UAV is accurately recognized based on the type identifier comparison table. For example, the abovementioned digital manner may be adopted by the core network, the base station and the UAV to represent the type identifier of the UAV in a unified manner. The UAV supervision platform may use a to represent a micro UAV, use b to represent a light UAV, use c to represent a small UAV, use d to represent a medium-sized UAV and use e to represent a large UAV. In such case, the type identifier comparison table may include the following information: 1 corresponds to a, 2 corresponds to b, 3 corresponds to c, 4 corresponds to d and 5 corresponds to e. When the core network sends the type identifier of the UAV to the UAV supervision platform, the type identifier may be converted for transmission based on the type identifier comparison table such that the UAV supervision platform can recognize the type identifier.

In Operation 302a3, the core network sends the target supervision strategy information to the base station.

In Operation 302a4, the base station receives the target supervision strategy information from the core network.

In the embodiment of the present disclosure, when the UAV is a civilian UAV, the UAV may further send a unique identifier to the base station. The base station, after acquiring the target supervision strategy information, may correspondingly store the target supervision strategy information and the unique identifier into a historical supervision list. When the UAV flies again, namely the base station subsequently acquires an access message from the UAV again, whether the historical supervision list records the target supervision strategy information corresponding to the unique identifier of the UAV is queried; and if YES, the operation that the target supervision strategy information is acquired based on the type identifier of the UAV may be not executed and flight of the UAV may be directly controlled based on the recorded target supervision strategy information.

It is to be noted that, for ensuring the effectiveness and accuracy of a supervision strategy, the base station may clear the historical supervision list. In an implementation process, when a supervision requirement for the UAV changes, the base station may clear the historical supervision list. Or, when a data volume of the historical supervision list reaches a preset threshold, the historical supervision list is cleared. Or, the base station may periodically clear the historical supervision list. No limits are made thereto in the embodiment. The preset threshold may be preset or modified by the base station, and no limits are made thereto in the embodiment. Periodically clearing the historical supervision list may avoid information redundancies caused by storage of a large amount of UAV information that has not been used for a long time and may also improve the query efficiency of the historical supervision list.

In a second implementation mode, the access message is the random access message. The process that the base station acquires the target supervision strategy information based on the access message of the UAV may include the following three implementation manners.

In a first implementation manner, the base station may locally acquire the target supervision strategy information. In this manner, the process that the base station acquires the target supervision strategy information based on the access message of the UAV may be as follows: a locally stored preset strategy table is read, and supervision strategy information corresponding to the type identifier in the preset strategy table is determined as the target supervision strategy information. The preset strategy table is configured to store supervision strategy information corresponding to different types of UAVs. For example, the preset strategy information stores a corresponding relationship between multiple groups of UAV type identifiers and supervision strategy information.

The preset strategy table may be acquired in advance by the base station from the core network, or may also be acquired in advance by the base station from the UAV supervision platform or directly configured in the base station by technical personnel. No limits are made thereto in the embodiment. In a second implementation manner, the base station may acquire the target supervision strategy information from the core network based on the access message. In this manner, the base station may send a first strategy request to the core network, the first strategy request carrying the type identifier of the UAV. The core network may determine the target supervision strategy information based on the type identifier. The base station may acquire the target supervision strategy information from the core network.

The process that the core network determines the target supervision strategy information based on the type identifier is similar to the process in Operation 302a2 that the core network determines the target supervision strategy information based on the type identifier, and will not be elaborated herein.

The core network, after acquiring the target supervision strategy information, may send the target supervision strategy information to the base station. The base station may receive the target supervision strategy information.

In a third implementation manner, the base station may acquire the target supervision strategy information from the UAV supervision platform based on the access message. In this manner, the base station may send a second strategy request to the UAV supervision platform, the second strategy request carrying the type identifier of the UAV and the UAV supervision platform being configured to determine the target supervision strategy information based on the type identifier, and may acquire the target supervision strategy information from the UAV supervision platform.

It is to be noted that, in the embodiment, the base station may be directly connected with the UAV supervision platform and the base station may acquire the latest supervision strategy information in real time from the UAV supervision platform, so that the UAV supervision timeliness can be ensured. The UAV supervision platform may be built in the supervision server. The supervision server may be a server cluster and may provide the UAV supervision cloud service.

For the second implementation manner and the third implementation manner, when the UAV is a civilian UAV, the UAV may further send the unique identifier to the base station. The base station, after acquiring the target supervision strategy information, may correspondingly store the target supervision strategy information and the unique identifier in the historical supervision list. When the UAV flies again, namely when the base station subsequently acquires an access message from the UAV again, whether the historical supervision list records the target supervision strategy information corresponding to the unique identifier of the UAV or not is queried; and if YES, the operation that the target supervision strategy information is acquired based on the access message of the UAV may be not executed and flight of the UAV may be directly controlled based on the recorded target supervision strategy information. Descriptions about clearing of the historical supervision list are similar to the corresponding descriptions in Operation 302a4, and elaborations are omitted herein.

It is to be noted that, in the embodiment, the descriptions are made only with the condition that the access message is the attach request signaling or the random access message as an example. A specific form of the access message is not limited.

In Operation 303, the base station sends a control instruction to the UAV based on the target supervision strategy information. In the embodiment of the present disclosure, supervision strategy information of a certain type of a UAV may include reporting requirement information of the UAV of this type and one or more of: a maximum flight speed, a flight range and a service expiration. That is, the target supervision strategy information includes reporting requirement information of the UAV and one or more of: a maximum flight speed, a flight range and a service expiration of the UAV.

The flight range includes a horizontal range and vertical range of flight. The service expiration represents service time spent in a flying area this time, including starting time and ending time of flight in the area, for example, 0:00 on May 1 to 16:00 on May 2.

The reporting requirement information is configured to indicate whether information reporting is required before the UAV of this type is used, namely whether a planned flight application is required to be submitted or not. For example, information reporting is required for flight of all UAVs other than micro UAVs outside a prohibited area. For a UAV of which information has been reported, the UAV supervision platform may store an information reporting record of the UAV, the information reporting record carrying a unique identifier of the UAV.

The base station, after receiving the target supervision strategy information, may acquire the reporting requirement information of the UAV from the target supervision strategy information. Based on different contents of the reporting requirement information, the process that the base station sends the control instruction to the UAV based on the target supervision strategy information may include the following two conditions.

A first condition is when the reporting requirement information indicates that information reporting is required before the UAV is used, the process that the base station sends the control instruction to the UAV based on the target supervision strategy information includes that: whether the UAV has reported to the UAV supervision platform or not is determined based on the unique identifier of the UAV, and in response to the UAV not reporting to the UAV supervision platform, it is determined that the UAV is prohibited from flying and a flight ban instruction is sent to the UAV.

The process that the base station determines whether the UAV has reported to the UAV supervision platform or not based on the unique identifier of the UAV may include that the base station sends a reported information acquisition request to the UAV supervision platform, the reported information acquisition request carrying the unique identifier of the UAB, and the UAV supervision platform queries whether an information reporting record corresponding to the unique identifier exists or not based on the unique identifier, and if YES, the UAV returns an acknowledgment message, otherwise, the UAV returns a negative acknowledgment message. The base station, after receiving the negative acknowledgment message, determines that the UAV does not report to the UAV supervision platform, determines that the UAV is prohibited from flying and sends the flight ban instruction to the UAV. The base station, upon receiving the acknowledgment message, may determine that the UAV has reported and may determine that the UAV is allowed to fly. The base station may control flight of the UAV based on other information in the target supervision strategy, for example, the maximum flight speed, the flight range and the service expiration. This process is similar to the process of controlling flight of the UAV in the following two conditions and will not be elaborated herein. It is to be noted that the base station may also determine whether the UAV has reported or not from the UAV supervision platform indirectly through the core network. No limits are made thereto in the embodiment.

The second condition is when the reporting requirement information indicates that information reporting is not required before the UAV is used, it is determined that the UAV is allowed to fly, and the base station controls flight of the UAV based on other information in the target supervision strategy, for example, the maximum flight speed, the flight range and the service expiration.

Under this condition, the base station sends the control instruction to the UAV based on the target supervision strategy information in the following three manners.

A first manner is that the base station acquires a flight speed of the UAV in real time, and when the flight speed of the UAV is likely to exceed the maximum flight speed, sends a speed control instruction to the UAV.

The UAV may report flight speed information to the base station in real time. A manner for judging that the flight speed of the UAV is likely to exceed the maximum flight speed is as follows: multiple speed values of the UAV are continuously acquired; an average acceleration amplitude of the UAV is determined according to the multiple speed values; and when the average acceleration amplitude is positive and it is predicted according to a present speed and average acceleration amplitude of the UAV that the speed of the UAV exceeds the maximum flight speed after a preset time length, the speed control instruction is sent to the UAV. The preset time length may be preset or modified by the base station, and no limits are made thereto in the embodiment.

The speed control instruction may be configured to instruct the UAV to fly at a specified speed lower than the maximum flight speed. Or, the speed control instruction is configured to instruct the UAV to stop accelerating and fly at the present speed or a speed lower than the present speed. The specified speed may be preset or modified by the base station, and no limits are made thereto in the embodiment.

A second manner is that the base station acquires positioning information of the UAV in real time, and when determining whether the UAV is likely to exceed the flight range according to the positioning information and the horizontal range and vertical range of the flying area, sends a direction control instruction to the UAV.

The positioning information of the UAV may include a latitude, longitude and altitude of the UAV. The horizontal range of the flying area may be represented with the latitude and the longitude, and the vertical range of the flying area may be represented with the altitude.

The process that the base station determines whether the UAV is likely to exceed the flight range according to the positioning information of the UAV and the horizontal range and vertical range of the flying area may include that, when a distance between the latitude and longitude of the UAV and a boundary value of the horizontal range is less than a preset distance, it is determined that the UAV is likely to exceed the horizontal range of the flight range. Or, when a height difference between an altitude value of the UAV and a boundary value of the vertical range is less than a preset height, it is determined that the UAV is likely to exceed the vertical range of the flight range. Both the preset distance and the preset height may be preset or modified by the base station, and no limits are made thereto in the embodiment.

It is to be noted that the condition that the UAV is likely to exceed the horizontal range of the flight range or the UAV is likely to exceed the vertical range of the flight range belongs to the scope that the UAV is likely to exceed the flight range.

The direction control instruction is configured to instruct the UAV to fly to a direction far away from the flight range. For example, the direction control instruction may be configured to instruct the UAV to fly to a direction opposite to a present direction. Or, when the UAV is likely to exceed the horizontal range of the flight range, the direction control instruction may be configured to instruct the UAV to be redirected for flight in a horizontal direction. When the UAV is likely to exceed the vertical range of the flight range, the direction control instruction may be configured to instruct the UAV to be redirected for flight in a vertical direction.

A third manner is that the base station acquires a flight state of the UAV, the flight state including flying and stopped. When it is determined that the UAV is flying and present system time is outside the range of the service time in the target supervision strategy information, a landing instruction is sent to the UAV.

The base station may determine the flight state of the UAV based on the flight speed of the UAV. For example, when the base station determines that speeds of the UAV in both the horizontal and vertical directions are not 0, it is determined that the UAV is in a flying state; and if the speeds are 0, it is determined that the UAV is in a stopped state. For ensuring safe landing of the UAV, the landing instruction may be configured to instruct the UAV to land at a take-off point.

In Operation 304, the UAV, after receiving the control instruction from the base station, controls flight based on the control instruction.

Corresponding to the two conditions for the operation in Operation 303 that the base station sends the control instruction to the UAV based on the target supervision strategy information, the operation in Operation 304 that the UAV controls flight based on the control instruction includes the following two conditions.

A first condition is that, when the base station determines based on the reported information of the UAV to prohibit the UAV from flying, the UAV executes a turning-off operation in response to receiving the flight ban instruction.

A second condition is that the UAV controls flight based on the control instruction according to a specific content of the target supervision strategy information, including the following three manners.

A first manner is that the UAV, in response to receiving a speed control instruction, flies at the speed indicated by the speed control instruction. For example, when the speed control instruction instructs the UAV to fly at a specified speed lower than the maximum flight speed, the UAV flies according to the specified speed. When the speed control instruction instructs the UAV to stop accelerating and fly at the present speed or a speed lower than the present speed, the UAV flies according to the present speed or flies at a speed after the present speed is reduced by a preset amplitude. The preset amplitude may be pre-configured in the UAV by the base station or configured in the UAV through a mobile terminal. No limits are made thereto in the embodiment.

A second manner is that the UAV, in response to receiving a direction control instruction, flies at the direction indicated by the direction control instruction. For example, when the direction control instruction instructs the UAV to fly to the direction opposite to the present direction, the UAV is controlled to turn 180 degrees relative to the present direction to fly. When the direction control instruction instructs the UAV to change direction in the horizontal direction, the UAV is controlled to change the direction relative to the present horizontal direction according to a first preset angle and a first rotation direction to fly. When the direction control instruction instructs the UAV to change direction in the vertical direction, the UAV is controlled to change the direction relative to the present vertical flight direction according to a second preset angle and a second rotation direction to fly.

The first preset angle and the second preset angle may be the same or different. Both of them may be pre-configured in the UAV by the base station, and angle magnitudes of them may be 10 degrees, 20 degrees, 30 degrees and the like. No limits are made thereto in the embodiment. The first rotation direction and the second rotation direction may be the same or different. Both of them may be counterclockwise or clockwise, and may be pre-configured in the UAV by the base station.

A third manner is that the UAV, in response to receiving a landing instruction, starts a self-landing program, and the UAV controls landing by taking a position of the take-off point recorded when taking off as a target position.

It is to be noted that, in the embodiment of the present disclosure, the base station may directly control flight of the UAV or may control flight of the UAV through the mobile terminal or a remote controller. An Application (APP) for controlling the UAV may be installed in the mobile terminal. The mobile terminal may communicate with the base station through a cellular network. A chip capable of communicating with the base station may be also arranged in the remote controller to implement communication with the base station. In the operations, information involved in interaction between the base station and the UAV may be relayed through the mobile terminal or the remote controller. Or, for example, the base station may also send the target supervision strategy information of the UAV to the mobile terminal, and the mobile terminal may generate the control instruction for the UAV based on whether flight is allowed or not, maximum flight speed, flight range and service expiration indicated by the target supervision strategy information and may control flight of the UAV according to the control instruction. Or, the mobile terminal may set a flight alarm boundary value based on whether flight is allowed or not, maximum flight speed, flight range and service expiration indicated by the target supervision strategy information to alert a pilot of the UAV to control the UAV to make a normal flight. For example, the flight alarm boundary value may include a flight speed alarm value, a flight latitude and longitude alarm value, a flight altitude alarm value and an effective flight time alarm value. When the flight speed of the UAV reaches the flight speed alarm value, the latitude and longitude of the UAV reach the latitude and longitude alarm value, the flight altitude reaches the altitude alarm value and the present time reaches the effective flight time alarm value, the mobile terminal may alarm and display alarm information. The alarm information may be, for example, information that "fly at the speed lower than 40 kilometers per hour, the present speed is 41 kilometers per hour".

According to the method provided in the embodiment of the present disclosure, the UAV may send an access message carrying the type identifier of the UAV to a base station in the process of accessing the base station, and the base station may acquire target supervision strategy information of the UAV based on the access message and control flight of the UAV based on the target supervision strategy information, so that it is ensured that flight of the UAV meets a supervision requirement. Since the UAV wirelessly communicates with the base station through a cellular network, the process of the communication is less susceptible to interference, the quality of the communication is reliable, the accuracy of controlling the UAV is improved, and effective supervision of the UAV may be implemented based on the method provided in the present disclosure.

Figure 4:
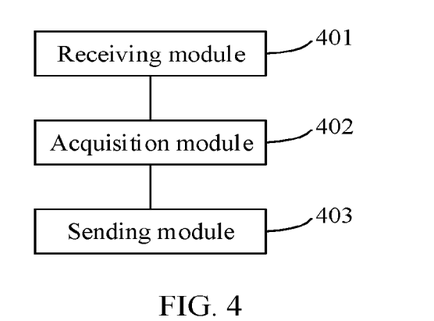
FIG. 4 is a block diagram of an apparatus for controlling a UAV according to an exemplary embodiment.

FIG. 4 is a block diagram of an apparatus for controlling a UAV according to an exemplary embodiment. Referring to FIG. 4, the device includes a receiving module 401, an acquisition module 402 and a sending module 403. Of course, it should be understood that one or more of the modules described in this disclosure may be implemented by circuitry.

The receiving module 401 is connected with the acquisition module 402, and is configured to receive an access message from a UAV. The access message carries a type identifier of the UAV. The acquisition module 402 is connected with the sending module 403, and is configured to acquire target supervision strategy information based on the access message, the target supervision strategy information indicating a flight criterion of the UAV. The sending module 403 is configured to send a control instruction to the UAV based on the target supervision strategy information, the UAV being configured to control flight based on the control instruction.

In a possible implementation mode, the access message may be attach request signaling.

In another implementation mode, the sending module is configured to send initial UE message signaling to a core network. The initial UE message signaling includes the attach request signaling. The core network is configured to acquire the type identifier of the UAV from the initial UE message signaling, determine the target supervision strategy information based on the type identifier and send the target supervision strategy information to a base station. The sending module is configured to receive the target supervision strategy information from the core network.

In a possible implementation mode, the access message may be a random access message.

In a further implementation mode, the acquisition module is configured to read a preset strategy table configured to store supervision strategy information corresponding to different types of UAVs, and determine the supervision strategy information corresponding to the type identifier in the preset strategy table as the target supervision strategy information; or, send a first strategy request to the core network, the first strategy request carrying the type identifier and the core network being configured to determine the target supervision strategy information based on the type identifier; and acquire the target supervision strategy information from the core network; or, send a second strategy request to a UAV supervision platform, the second strategy request carrying the type identifier and the UAV supervision platform being configured to determine the target supervision strategy information based on the type identifier, and acquire the target supervision strategy information from the UAV supervision platform.

In a possible implementation mode, the random access message may be an Msg3 in a random access process, or, the random access message may be an Msg5 in a random access process.

In another implementation mode, the target supervision strategy information may include reporting requirement information of the UAV and one or more of a maximum flight speed, a flight range and a service expiration of the UAV. The reporting requirement information may indicate whether information reporting is required before the UAV is used.

In a possible implementation mode, the sending module is configured to, when the reporting requirement information in the target supervision strategy information indicates that information reporting is required before the UAV is used, determine whether the UAV has reported to the UAV supervision platform or not based on a unique identifier of the UAV; and, in response to the UAV not reporting to the UAV supervision platform, send a flight ban instruction to the UAV.

According to the apparatus provided in the embodiment of the present disclosure, when an access message of the UAV is received, target supervision strategy information of the UAV may be acquired based on the access message, and flight of the UAV may be controlled based on the target supervision strategy information, so that it is ensured that flight of the UAV meets a supervision requirement. Since wireless communication with the UAV is performed based on a cellular network, the process of the communication is less susceptible to interference, the quality of the communication is reliable, the accuracy of controlling the UAV is improved, and effective supervision of the UAV may be implemented based on the method provided in the present disclosure.

Figure 5:
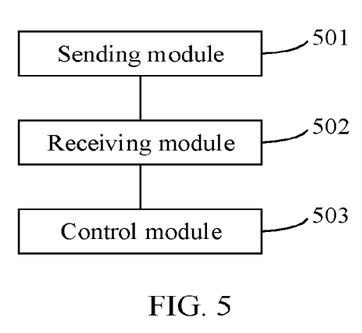
FIG. 5 is a block diagram of an apparatus for controlling a UAV according to an exemplary embodiment.

FIG. 5 is a block diagram of an apparatus for controlling a UAV according to an exemplary embodiment. Referring to FIG. 5, the apparatus includes a sending module 501, a receiving module 502 and a control module 503.

The sending module 501 is connected with the receiving module 502, and is configured to send an access message to a base station in a process of accessing the base station. The access message carries a type identifier of a UAV. The base station is configured to acquire target supervision strategy information based on the access message and send a control instruction to the UAV based on the target supervision strategy information. The target supervision strategy information indicates a flight criterion of the UAV. The receiving module 502 is connected with the control module 503, and is configured to receive the control instruction from the base station. The control module 503 is configured to control flight based on the control instruction.

In a possible implementation mode, the access message may be attach request signaling, or, the access message may be a random access message.

In a further implementation mode, when the access message is a random access message, the random access message is an Msg3 in a random access process, or, the random access message is an Msg5 in a random access process.

In another implementation mode, the target supervision strategy information may include reporting requirement information of the UAV and one or more of a maximum flight speed, a flight range and a service expiration of the UAV.

The reporting requirement information indicates whether information reporting is required before the UAV is used.

In a possible implementation mode, the control module is configured to, in response to receiving a flight ban instruction from the base station, execute a turning-off operation.

According to the apparatus provided in the embodiment of the present disclosure, an access message carrying the type identifier of the UAV may be sent to a base station in the process of accessing the base station, and then the base station may acquire target supervision strategy information based on the access message and control flight of the UAV based on the target supervision strategy information, so that it is ensured that flight of the UAV meets a supervision requirement. Since wireless communication with the base station is performed based on a cellular network, the process of the communication is less susceptible to interference, the quality of the communication is reliable, the accuracy of controlling the UAV is improved, and effective supervision of the UAV may be implemented based on the method provided in the present disclosure.

With respect to the apparatus in the above embodiments, the specific manners for performing operations for individual modules therein have been described in detail in the embodiment regarding the method, which will not be elaborated herein.

Figure 6:
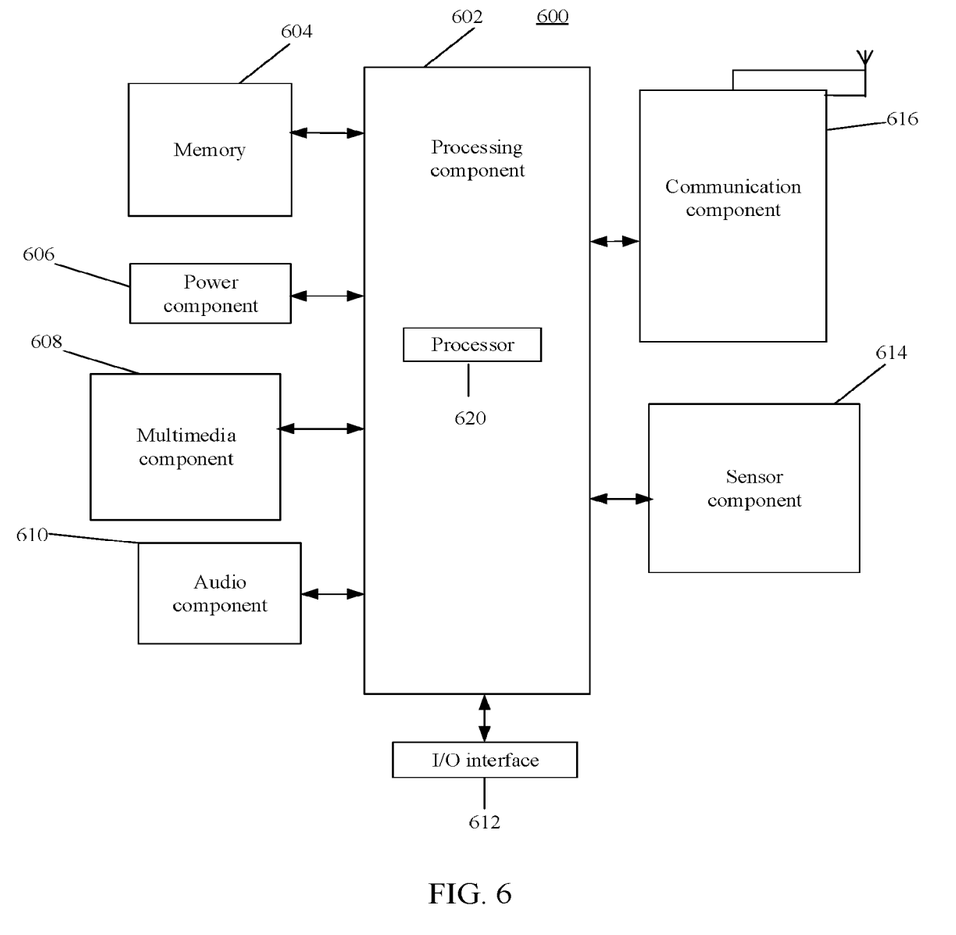
FIG. 6 is a block diagram of an apparatus for controlling a UAV according to an exemplary embodiment.

FIG. 6 is a block diagram of an apparatus for controlling a UAV according to an exemplary embodiment. For example, the apparatus 600 may be a UAV, a mobile phone, a computer, a remote control device, a messaging device, a gaming console, a tablet, and the like.

Referring to FIG. 6, the apparatus 600 may include one or more of the following components: a processing component 602, a memory 604, a power component 606, a multimedia component 604, an audio component 610, an Input/Output (I/O) interface 612, a sensor component 614, and a communication component 616.

The processing component 602 typically controls overall operations of the apparatus 600, such as the operations associated with display, telephone calls, data communications, camera operations, and recording operations. The processing component 602 may include one or more processors 620 to execute instructions to perform all or part of the operations in the abovementioned method. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operation of the apparatus 600. Examples of such data include instructions for any APPs or methods operated on the apparatus 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the apparatus 600. The power component 606 may include a power management system, one or more power supplies, and other components associated with generation, management and distribution of power for the apparatus 600.

The multimedia component 608 includes a screen providing an output interface between the apparatus 600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 608 includes a front camera and/or a rear camera. The front camera and/or the rear camera may receive external multimedia data when the apparatus 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a Microphone (MIC), and the MIC is configured to receive an external audio signal when the apparatus 600 is in the operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and a peripheral interface module, and the peripheral interface module may be a keyboard, a click wheel, a button and the like. The button may include, but not limited to a home button, a volume button, a starting button, and a locking button.

The sensor component 614 includes one or more sensors configured to provide status assessment in various aspects for the apparatus 600. For instance, the sensor component 614 may detect an on/off status of the apparatus 600 and relative positioning of components, such as a display and small keyboard of the apparatus 600, and the sensor component 614 may further detect a change in a position of the apparatus 600 or a component of the apparatus 600, presence or absence of contact between the user and the apparatus 600, orientation or acceleration/deceleration of the apparatus 600 and a change in temperature of the apparatus 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging APP. In some embodiments, the sensor component 614 may also include an acceleration sensor, a gyroscope sensor, a magnetic sensor, a pressure sensor or a temperature sensor.

The communication component 616 is configured to facilitate wired or wireless communication between the apparatus 600 and another device. The apparatus 600 may access any communication-standard-based wireless network, such as a Wi-Fi network, a 2nd-Generation (2G) or 3rd-Generation (3G) network or a combination thereof. In an exemplary embodiment, the communication component 616 receives a broadcast signal or broadcast associated information from an external broadcast management system through a broadcast channel. In an exemplary embodiment, the communication component 616 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the apparatus 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method for controlling a UAV.

In an exemplary embodiment, there is also provided a non-transitory computer-readable storage medium including an instruction, such as the memory 604 including an instruction, and the instruction may be executed by the processor 620 of the apparatus 600 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

In an exemplary embodiment, a non-transitory computer-readable storage medium is also provided, instructions in the storage medium being executed by a processor of a terminal to enable the terminal to execute the method for controlling a UAV.

Figure 7:
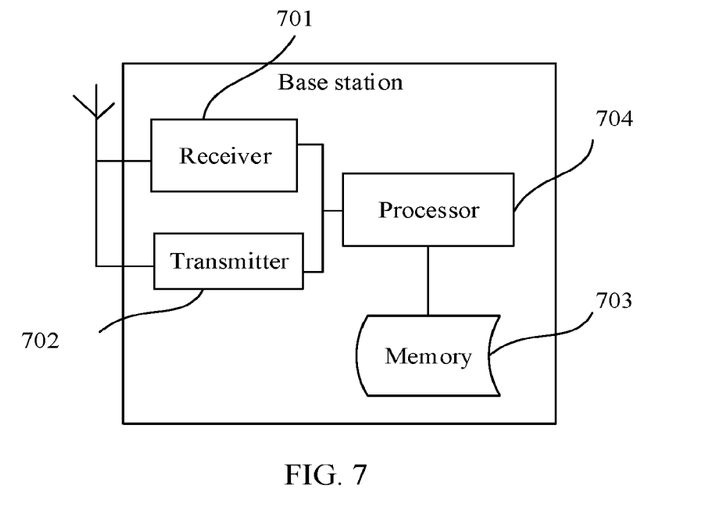
FIG. 7 is a structure diagram of a base station according to an exemplary embodiment.

FIG. 7 is a structure diagram of a base station according to an exemplary embodiment. A receiver 701, a transmitter 702, a memory 703 and a processor 704 are included. The receiver 701, the transmitter 702 and the memory 703 are connected with the processor 704 respectively. The memory 703 is configured to store instructions executable by the processor. The processor 704 is configured to execute the operations executed by the base station in the method for controlling a UAV.

In an exemplary embodiment, there is also provided a non-transitory computer-readable storage medium storing instructions, such as the memory storing instructions, and the instructions may be executed by the processor 820 in the base station to implement the operations executed by the base station in the abovementioned embodiments. For example, the non-transitory computer-readable storage medium may be a ROM, a RAM, a CD-ROM, a magnetic tape, a floppy disc, an optical data storage device and the like.

The technical solutions provided in the embodiments of the present disclosure can have beneficial effects. For example, a UAV may send an access message carrying a type identifier of the UAV to a base station in a process of accessing the base station. The base station may acquire target supervision strategy information of the UAV based on the access message and control flight of the UAV based on the target supervision strategy information, so that it is ensured that flight of the UAV meets a supervision requirement. Since the UAV wirelessly communicates with the base station through a cellular network, the communication is less susceptible to interference, the quality of the communication is reliable, the accuracy of controlling the UAV is improved, and effective supervision of the UAV may be implemented based on the method provided in the present disclosure.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for controlling an Unmanned Aerial Vehicle (UAV) that is applicable to a base station, the method comprising:

receiving an access message from a UAV, the access message including a type identifier of the UAV, the type identifier indicating a type of the UAV, the access message being attach request signaling or a random access message, and the type of the UAV comprising an unmanned fixed-wing aircraft, an unmanned vertical take-off and landing aircraft, an unmanned airship, an unmanned helicopter, an unmanned multi-rotor aircraft or an unmanned parawing aircraft;

acquiring target supervision strategy information matched with the type of the UAV based on the access message, the target supervision strategy information indicating a flight criterion of the UAV; and sending a control instruction to the UAV based on the target supervision strategy information, the UAV being configured to control flight based on the control instruction, wherein the target supervision strategy information comprises reporting requirement information of the UAV and one or more of a maximum flight speed, a flight range, and a service expiration of the UAV, and the reporting requirement information indicates whether information reporting is required before the UAV is used;

wherein the sending the control instruction to the UAV based on the target supervision strategy information further comprises:

determining whether the UAV has reported to a UAV supervision platform or not based on a unique identifier of the UAV when the reporting requirement information in the target supervision strategy information indicates that information reporting is required before the UAV is used; and sending a flight ban instruction to the UAV when the UAV has not reported to the UAV supervision platform.

2. The method of claim 1, wherein the access message is the attach request signaling.

3. The method of claim 2, wherein the acquiring the target supervision strategy information based on the access message further comprises:

sending initial User Equipment (UE) message signaling to a core network, wherein the initial UE message signaling comprises the attach request signaling, the type identifier of the UAV is acquired from the initial UE message signaling, and the target supervision strategy information is determined based on the type identifier and is sent to the base station; and receiving the target supervision strategy information from the core network.

4. The method of claim 1, wherein the access message is the random access message.

5. The method of claim 4, wherein the acquiring the target supervision strategy information based on the access message further comprises:

reading a preset strategy table that is configured to store supervision strategy information corresponding to different types of UAVs, and determining supervision strategy information corresponding to the type identifier in the preset strategy table as the target supervision strategy information;

sending a first strategy request to a core network, the first strategy request carrying the type identifier which is used to determine the target supervision strategy information, and acquiring the target supervision strategy information from the core network; or sending a second strategy request to a UAV supervision platform, the second strategy request carrying the type identifier that is used to determine the target supervision strategy information, and acquiring the target supervision strategy information from the UAV supervision platform.

6. The method of claim 4, wherein the random access message is a Message 3 (Msg3) in a random access process or a Message 5 (Msg5) in a random access process.

7. A method for controlling an Unmanned Aerial Vehicle (UAV) that is applicable to a UAV, the method comprising:

sending an access message to a base station in a process of accessing the base station, wherein the access message includes a type identifier of the UAV, the type identifier indicates a type of the UAV, the access message is attach request signaling or a random access message, the type of the UAV comprises an unmanned fixed-wing aircraft, an unmanned vertical take-off and landing aircraft, an unmanned airship, an unmanned helicopter, an unmanned multi-rotor aircraft or an unmanned parawing aircraft, the access message is used to acquire target supervision strategy information matched with the type of the UAV based on which a control instruction is sent to the UAV, and the target supervision strategy information indicates a flight criterion of the UAV;

receiving the control instruction from the base station; and controlling flight based on the control instruction, wherein the target supervision strategy information comprises reporting requirement information of the UAV and one or more of a maximum flight speed, a flight range, and a service expiration of the UAV, and the reporting requirement information indicates whether information reporting is required before the UAV is used;

wherein the controlling flight based on the control instruction further comprises:

executing a turning-off operation when receiving a flight ban instruction from the base station.

8. The method of claim 7, wherein, when the access message is the random access message, the random access message is a Message 3 (Msg3) in a random access process or a Message 5 (Msg5) in a random access process.

9. An apparatus for controlling an Unmanned Aerial Vehicle (UAV) that is applicable to a base station, the apparatus having a receiver, a transmitter, a memory, and a processor, the receiver, the transmitter, and the memory being connected with the processor respectively, and the memory is configured to store instructions that, when executed by the processor, cause the processor to perform operations comprising:

controlling the receiver to receive an access message from a UAV, the access message including a type identifier of the UAV, the type identifier indicating a type of the UAV, the access message being attach request signaling or a random access message, and the type of the UAV comprising an unmanned fixed-wing aircraft, an unmanned vertical take-off and landing aircraft, an unmanned airship, an unmanned helicopter, an unmanned multi-rotor aircraft or an unmanned parawing aircraft;

acquiring target supervision strategy information matched with the type of the UAV based on the access message, the target supervision strategy information indicating a flight criterion of the UAV; and controlling the transmitter to send a control instruction to the UAV based on the target supervision strategy information, the UAV being configured to control flight based on the control instruction, wherein the target supervision strategy information comprises reporting requirement information of the UAV and one or more of a maximum flight speed, a flight range, and a service expiration of the UAV, and the reporting requirement information indicates whether information reporting is required before the UAV is used;

wherein the processor performs operations further comprising:

determining whether the UAV has reported to a UAV supervision platform or not based on a unique identifier of the UAV when the reporting requirement information in the target supervision strategy information indicates that information reporting is required before the UAV is used; and controlling the transmitter to send a flight ban instruction to the UAV when the UAV has not reported to the UAV supervision platform.

10. The apparatus of claim 9, wherein the access message is the attach request signaling.

11. The apparatus of claim 10, wherein:

the transmitter is configured to send initial User Equipment (UE) message signaling to a core network, the initial UE message signaling including the attach request signaling, the type identifier of the UAV is acquired from the initial UE message signaling, and the target supervision strategy information is determined based on the type identifier and is sent to the base station, and the receiver is configured to receive the target supervision strategy information from the core network.

12. The apparatus of claim 9, wherein the processor performs operations further comprising:

reading a preset strategy table configured to store supervision strategy information corresponding to different types of UAVs, and determining supervision strategy information corresponding to the type identifier in the preset strategy table as the target supervision strategy information;

controlling the transmitter to send a first strategy request to a core network, wherein the first strategy request carries the type identifier, the target supervision strategy information is determined based on the type identifier and acquired from the core network; or controlling the transmitter to send a second strategy request to a UAV supervision platform, wherein the second strategy request carries the type identifier, the target supervision strategy information is determined based on the type identifier and acquired from the UAV supervision platform.

13. An apparatus for controlling an Unmanned Aerial Vehicle (UAV) that is applicable to a UAV, the apparatus comprising:

a processor; and a memory configured to store instructions executable by the processor, wherein the processor is configured to:

send an access message to a base station in a process of accessing the base station, wherein the access message includes a type identifier of the UAV, the type identifier indicates a type of the UAV, the access message is attach request signaling or a random access message, the type of the UAV comprises an unmanned fixed-wing aircraft, an unmanned vertical take-off and landing aircraft, an unmanned airship, an unmanned helicopter, an unmanned multi-rotor aircraft or an unmanned parawing aircraft, the access message is used to acquire target supervision strategy information matched with the type of the UAV based on which a control instruction is sent to the UAV, and the target supervision strategy information indicates a flight criterion of the UAV;

receive the control instruction from the base station; and control flight based on the control instruction, wherein the target supervision strategy information comprises reporting requirement information of the UAV and one or more of a maximum flight speed, a flight range, and a service expiration of the UAV, and the reporting requirement information indicates whether information reporting is required before the UAV is used;

wherein the processor is configured to execute a turning-off operation when receiving a flight ban instruction from the base station.

* * * * *